Patented Oct. 4, 1949

2,483,754

UNITED STATES PATENT OFFICE 2,483,754

BONDING RUBBERLIKE MATERIALS TO METAL

Maurice Clifton, Detroit, Mich., assignor to United States Rubber Company, New York, N. Y., a corporation of New Jersey Application August 24, 1945, Serial No. 612,349

12 Claims. (Cl. 154—43)

This invention relates to the adhesion of rubber or rubber-like compositions to materials such as metals. More particularly, the invention relates to a composite product resulting from the adhesion of rubber or synthetic rubber compositions to brass plated steel.

In the adhesion of natural rubber compositions to metal it has been general practice to coat the metal or steel with a plating of brass. When natural rubber compositions are vulcanized in contact with the brass plated metal, and in particular when a layer of rubber cement is interposed between the metal and the rubber body, a substantial adhesion results. The extent of this adhesion is usually in the order of 850 pounds per square inch. The bond of synthetic rubbers to metal presents a different problem. By following the accepted practice in the bonding of natural rubber to metal little or no adhesion results in substituting synthetic rubbers for the natural rubber. By synthetic rubbers I refer to those modified butadiene-1,3-derived rubbery materials which lie within the class of Neoprene (polychloroprene), Buna S (rubbery copolymer of butadiene-1,3 and styrene), Buna N (rubbery copolymer of butadiene-1,3 and acrylonitrile), butyl (rubbery copolymer of a major proportion of monolefine, e. g., isobutylene, with a minor proportion of a conjugated 1,3-diene, e. g., butadiene). It has been found that if the synthetic rubber is compounded with silica aerogel, or if a layer of cement including aerogel is interposed between the synthetic rubber and the metal, and the composite assembly subjected to pressure at vulcanizing temperatures, e. g., 285° F. to 320° F., good adhesion results are obtained.

It is an object of the invention to provide means whereby high degree of adhesion may be obtained between rubber or synthetic rubbers and metal, and to provide means whereby, through the use of stable and economic materials, it is possible to conduct adhesion processing with synthetic rubber in accordance with the same general operating steps as required in the bonding of natural rubber.

Figure 1:
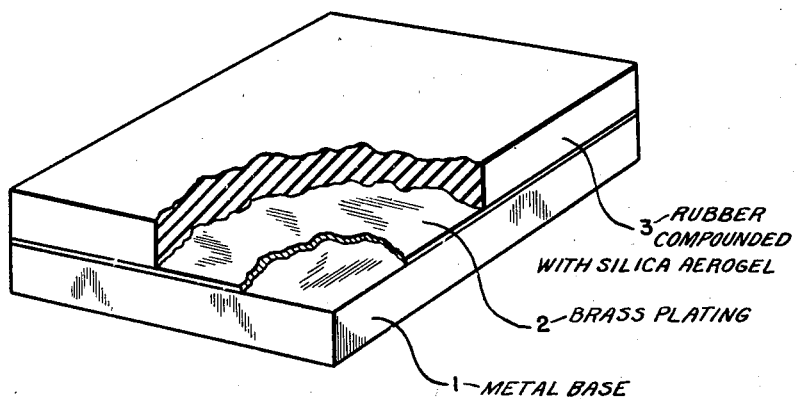
Figure 2:
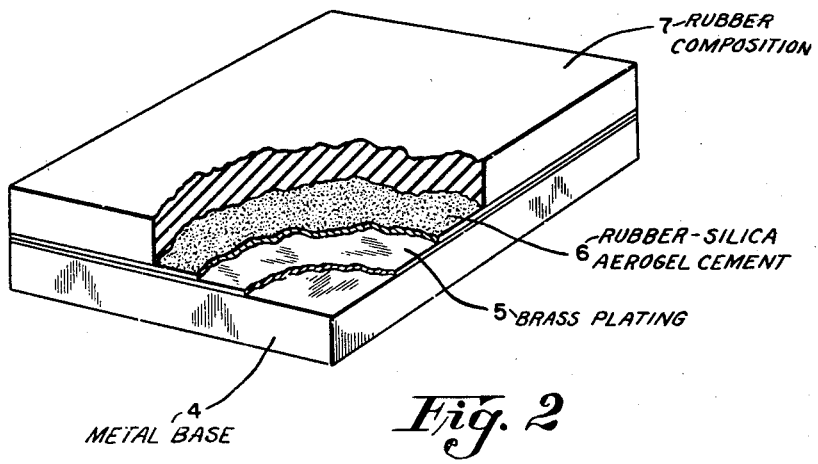

These and other objects and advantages will appear more fully in the following detailed description, when considered in connection with the accompanying drawing, in which:

Fig. 1 is a perspective view of an embodiment of my invention illustrating the application of a synthetic rubber composition in bonded relation with a metal base; and, Fig. 2 is a perspective view of a synthetic rubber composition bonded to a metal base in which an interposed layer of cement is utilized.

With reference to the drawing, and in particular to Fig. 1, a composite product is shown representing an embodiment of the invention in the form of a metal base 1, a layer of brass plate 2, and a synthetic rubber composition 3. In the conventional practice of bonding rubber to metal the principal metal body is of ferrous metal such as steel. A coating of brass plate is applied to the steel in the conventional manner as by electro-deposition. The cleaning of the steel prior to the application of the brass plate is also contemplated.

It is proposed to bond synthetic rubber directly to the brass plated metal. It has been found that this may be accomplished by adding to the synthetic rubber composition a substantial quantity of the silica aerogel. Silica aerogel may be obtained as a finely divided powder as manufactured for the trade under the name of Santocel; it may be produced as described in the Kistler U. S. Patent No. 2,093,454. This silica gel, which is presently contemplated, is in the form of a dry aerogel and is distinguished from the soft silica hydrogels. This material may be added to the synthetic rubber composition in accordance with conventional milling practices.

Among the synthetic rubbers which are applicable to the present invention and which show substantial improvements with adhesion on brass plated metal are such compositions as neoprene GN, Buna S, butyl, and Buna N. Since all of these materials are thermosetting it may be said that the synthetic rubbers which are contemplated are those of a vulcanizable character.

As a modified form of the invention I contemplate the use of silica aerogel cement as a layer for interposition between a brass plated metal and a body of rubber or synthetic rubber. Such an arrangement is shown in Fig. 2 of the drawing which illustrates a metal base 4 having a brass plating 5 electro-deposited thereon, a layer of silica aerogel cement 6, and a principal body 7 of rubber or synthetic rubber composition. In order to avoid the necessity of utilizing silica aerogel throughout the composition of the rubber, a cement is prepared in which silica aerogel is a principal bonding ingredient. This cement is applied to the brass plate by means of painting, dipping, or spraying. Subsequently, the body of rubber or synthetic rubber is applied to the cemented metal and the assembly is subjected to vulcanization at which time the composition becomes bonded to the metal base.

Any organic solvent useful in the preparation of rubber cements may be used, e. g., gasoline, benzene, methyl ethyl ketone, etc.

The cement as prepared for this purpose preferably has a base of the same type of rubber or synthetic rubber as the principal body 7 of the composition. For example, if the body of synthetic rubber is in the form of neoprene, then neoprene is used to form the basis of the cement. As in the case where the synthetic rubber composition is bonded directly to the brass plate, the principal ingredient which produces the adhesive characteristics is silica gel of the aerogel type.

An improvement in the adhesion of natural rubber compositions with metals may also be obtained by incorporating silica aerogel with the composition. Ordinarily, natural rubber compositions give good adhesions with brass plated metals. For example, an adhesion in the order of 750 lbs. per square inch direct pull may be obtained by the following composition (parts are by weight):

| | |
|---|---:|
| Rubber | 100.00 |
| Zinc oxide | 5.00 |
| Carbon black | 20.00 |
| Pine tar | 5.00 |
| Stearic acid | 1.00 |
| Accelerator | .75 |
| Age resistor | 1.00 |
| Sulfur | 3.00 |

When 27.15 parts of silica aerogel are added to this composition, the resulting adhesion is increased to 850 lbs. per square inch. A still further increase in adhesion is obtained when between the above identified stock and the brass plated metal is interposed a layer of cement having a base of the above composition with the addition of silica aerogel. In such case the bond may be increased to 1095 lbs. per square inch. Different amounts of silica aerogel in the rubber cement will vary the degree of the bond. The following table illustrates the strength of the bond for different amounts of silica gel:

| Percent Silica Aerogel on Solids of Cement | Adhesion, Lbs. Per. Sq. In. |
|---|---:|
| 0 | 850 |
| 5 | 1,065 |
| 10 | 990 |
| 20 | 1,095 |
| 40 | 1,070 |
| 60 | 780 |

One of the principal synthetic rubbers with which the present invention is particularly applicable, is neoprene. Ordinarily, neoprene compositions show an adhesion to brass plate of about 180 lbs. per square inch. When silica aerogel is added to the neoprene composition a substantial increase in adhesion results. This is shown in the following examples:

| | | |
|---|---:|---:|
| Neoprene | 100.0 | 100.0 |
| Zinc oxide | 5.0 | 5.0 |
| Carbon black | 20.0 | 20.0 |
| Process oil | 15.0 | 15.0 |
| Stearic acid | 1.0 | 1.0 |
| Antioxidant | 2.0 | 2.0 |
| Stabilizer | 4.0 | 4.0 |
| Silica aerogel | .0 | 29.4 |
| Adhesion, lbs./sq. in. | 180 | 500 |

Similar to natural rubber, neoprene when bonded to a brass plated metal with the interposition of a layer of neoprene-silica aerogel cement increases the bond so as to provide an adhesion of the order of 760 lbs. per square inch. As a direct comparison a neoprene composition bonded to a brass plated metal with an interposition layer of neoprene cement without silica aerogel exhibits a bond having a strength of only 140 lbs. per square inch. When the assembly has been unified in both instances namely (a) where the neoprene (synthetic rubber) is compounded with silica aerogel, and (b) where a layer of neoprene cement including the aerogel is interposed between the neoprene (synthetic rubber) composition and the metal base, the metal is adhered to a neoprene composition, the portion contiguous the metal containing dispersed silica aerogel.

Another synthetic rubber exhibiting good adhesion properties when used in combination with a silica aerogel composition is Buna S (GRS). Such a composition which may be used with silica aerogel is as follows:

| | |
|---|---:|
| Buna S | 100.0 |
| Zinc oxide | 5.0 |
| Carbon black | 40.0 |
| #6 Asphalt | 7.5 |
| Stearic acid | 1.0 |
| Accelerator | 1.0 |
| Antioxidant | 1.0 |
| Sulfur | 2.0 |

This Buna S composition when vulcanized in direct contact with a brass plated metal results in an adhesion of 620 pounds per square inch. With the interposition of a layer of cement of Buna S between the Buna S and the brass plate the adhesion is increased to only 650 lbs. per square inch. However, when a cement of the above composition, to which is added 31.5 parts of silica aerogel, is used as the interposing layer an adhesion of 800 lbs. per square inch results.

Buna N is another form of synthetic rubber which shows improved adhesion characteristics when compounded with silica aerogel. A conventional Buna N composition is as follows:

| | |
|---|---:|
| Buna N | 100.0 |
| Zinc oxide | 5.0 |
| Carbon black | 40.0 |
| Plasticizer | 15.0 |
| Stearic acid | 1.0 |
| Accelerator | 1.5 |
| Antioxidant | 1.0 |
| Sulfur | 1.5 |

Ordinarily this stock when vulcanized to brass plate shows an adhesion of 150 lbs. per square inch. When a cement of the same composition is used as an interposing layer the adhesion is increased to 260 lbs. per square inch., and when a cement of the Buna N is compounded with 33.0 parts of silica aerogel and interposed the resulting adhesion is in the order of 450 lbs. per square inch.

A composition of butyl, such as shown below, results in an adhesion with brass plate of only 90 lbs. per square inch.

| | |
|---|---:|
| Butyl | 100.0 |
| Zinc oxide | 5.0 |
| Carbon black | 40.0 |
| Plasticizer | 5.0 |
| Stearic acid | 1.0 |
| Accelerator | 1.5 |
| Sulfur | 1.5 |

With the addition of 27.8 parts of silica aerogel, and its use with the butyl as an interposing layer the bond is increased to 180 lbs. per square inch.

From the foregoing examples it is believed obvious, especially where neoprene is involved, that a low adhesion is obtained in the absence of silica aerogel in the composition and that relatively high degrees of adhesion are obtained upon the inclusion of silica aerogel. It is also noted that the average maximum adhesion is obtained when between 20% and 40% by weight (based on the solid rubber content) of silica aerogel is included in the composition, although some degree of adhesion, greater than where no silica aerogel is included, may be obtained with as low as 1% of the aerogel. However, when the amount of silica aerogel reaches 60% the stock becomes so loaded that it loses its rubberlike characteristics with the result that the adhesion drops off.

From the foregoing disclosure, it is believed apparent that I have provided a novel composite product in the bonding of rubber or synthetic rubber to metal, and while a preferred embodiment of the invention has been shown, it is to be understood it is susceptible to those modifications which appear obviously within the spirit of the invention and within the scope of the appended claims.

Having thus described my invention, what I claim and desire to protect by Letters Patent is:

1. A composite product comprising a cured assembly of polychloroprene composition bonded to brass of a brass plated metal base by a tenacious lasting bond of the same polychloroprene intermixed with from about 5 to 40 per cent by weight, based on the polychloroprene, of silica aerogel particles which are substantially uniformly dispersed throughout the mass.

2. A composite assembly comprising a vulcanized rubbery rubber mass bonded to brass, by having at least a portion of the said rubbery mass in substantially uniform admixture with between 1 and 60 percent by weight, based on the rubber, of silica aerogel particles, said admixture being cured and in direct adhering contact with the brass, the rubber in each instance being the same and selected from the class consisting of natural rubber, polychloroprene, rubbery copolymer of butadiene and styrene, rubbery copolymer of butadiene-1,3 and acrylonitrile, and rubbery copolymer of isobutylene and butadiene-1,3.

3. A composite assembly comprising a vulcanized rubbery rubber mass bonded to brass, by having at least a portion of the said rubbery mass in substantially uniform admixture with from about 5 to 40 percent by weight, based on the rubber, of silica aerogel particles, said admixture being cured and in direct adhering contact with the brass, the rubber in each instance being the same and selected from the class consisting of natural rubber, polychloroprene, rubbery copolymer of butadiene and styrene, rubbery copolymer of butadiene-1,3 and acrylonitrile, and rubbery copolymer of isobutylene and butadiene-1,3.

4. A composite assembly comprising a layer of a vulcanized rubbery rubber mass united to brass by a contiguous intermediate layer of a vulcanized substantially uniform admixture of the same type of rubber composition with between 1 and 60 percent by weight, based on the rubber, of silica aerogel particles, said vulcanized admixture being in direct adhering contact with the brass, the rubber in each instance being the same and selected from the class consisting of natural rubber, polychloroprene, rubbery copolymer of butadiene and styrene, rubbery copolymer of butadiene-1,3 and acrylonitrile, and rubbery copolymer of isobutylene and butadiene-1,3.

5. A composite assembly comprising a layer of a vulcanized rubbery rubber mass united to brass by a contiguous intermediate layer of a vulcanized substantially uniform admixture of the same type of rubber composition with from about 5 to 40 percent, based on the rubber, of silica aerogel particles, said vulcanized admixture being in direct adhering contact with the brass, the rubber in each instance being the same and selected from the class consisting of natural rubber, polychloroprene, rubbery copolymer of butadiene and styrene, rubbery copolymer of butadiene-1,3 and acrylonitrile, and rubbery copolymer of isobutylene and butadiene-1,3.

6. A composite assembly comprising a layer of cured polychloroprene composition bonded to brass, by having at least a portion of the said composition in substantially uniform admixture with between 1 and 60 percent by weight based on the polychloroprene, of silica aerogel particles, said admixture being cured and in direct adhering contact with the brass.

7. A composite assembly comprising a layer of cured polychloroprene composition bonded to brass, by having at least a portion of the said composition in substantially uniform admixture with from about 5 to about 40 percent by weight based on the polychloroprene, of silica aerogel particles, said admixture being cured and in direct adhering contact with the brass.

8. A composite assembly comprising a layer of a cured polychloroprene composition bonded to brass, by a contiguous intermediate layer of a cured substantially uniform admixture of the same type of polychloroprene composition with between 1 and 60 percent by weight, based on the polychloroprene, of silica aerogel particles, said cured admixture being in direct adhering contact with the brass.

9. A composite assembly comprising a layer of a cured polychloroprene composition bonded to brass, by a contiguous intermediate layer of a cured substantially uniform admixture of the same type of polychloroprene composition with from about 5 to about 40 percent by weight, based on the polychloroprene, of silica aerogel particles, said cured admixture being in direct adhering contact with the brass.

10. A composite assembly comprising a vulcanized rubbery rubber mass bonded to the brass of a brass plated metal base, by having at least a portion of the said rubbery mass in substantially uniform admixture with from about 5 to 40 percent by weight, based on the rubber, of silica aerogel particles, said admixture being cured and in direct adhering contact with the brass, the rubber in each instance being the same and selected from the class consisting of natural rubber, polychloroprene, rubbery copolymer of butadiene and styrene, rubbery copolymer of butadiene-1,3 and acrylonitrile, and rubbery copolymer of isobutylene and butadiene-1,3.

11. A composite assembly comprising a layer of a vulcanized rubbery rubber mass united to the brass of a brass plated metal base by a contiguous intermediate layer of a vulcanized substantially uniform admixture of the same type of rubber composition with from about 5 to 40 percent, based on the rubber, of silica aerogel particles, said vulcanized admixture being in direct adhering contact with the brass, the rubber in each instance being the same and selected from the class consisting of natural rubber, polychloroprene, rubbery copolymer of butadiene and styrene, rubbery copolymer of butadiene-1,3 and acrylonitrile, and rubbery copolymer of isobutylene and butadiene-1,3.

12. A composite assembly comprising a layer of a cured polychloroprene composition bonded to the brass of a brass plated metal base, by a contiguous intermediate layer of a cured substantially uniform admixture of the same type of polychloroprene composition with from about 5 to about 40 percent by weight, based on the polychloroprene, of silica aerogel particles, said cured admixture being in direct adhering contact with the brass.

MAURICE CLIFTON.

REFERENCES CITED

The following references are of record in the file of this patent:

UNITED STATES PATENTS

| Number | Name | Date |
|---|---|---|
| 1,617,588 | Geer | Feb. 15, 1927 |
| 2,269,377 | Omansky | Jan. 6, 1942 |
| 2,329,322 | Baty et al. | Sept. 14, 1943 |
| 2,366,896 | Griffith | Jan. 9, 1945 |

FOREIGN PATENTS

| Number | Country | Date |
|---|---|---|
| 315,916 | Great Britain | July 22, 1929 |
| 580,540 | Germany | July 12, 1933 |

OTHER REFERENCES

Buchan "Bonding Rubber to Metal," pp. 25–37, Transactions of India Rubber Industry, Sept. 1943.

Yerzley "Adhesion of Neoprene to Metal," pp. 950–956, Ind. & Eng. Chem., Aug. 1939.